(12) United States Patent
Mun et al.

(10) Patent No.: US 9,601,761 B2
(45) Date of Patent: Mar. 21, 2017

(54) COMPOSITE CATHODE ACTIVE MATERIAL, METHOD OF PREPARING THE COMPOSITE CATHODE ACTIVE MATERIAL, AND CATHODE AND LITHIUM BATTERY EACH INCLUDING THE COMPOSITE CATHODE ACTIVE MATERIAL

(71) Applicant: Samsung Electronics Co., Ltd., Suwon-si, Gyeonggi-do (KR)

(72) Inventors: Jun-young Mun, Seoul (KR); Jae-myung Lee, Seoul (KR); Gue-sung Kim, Yongin (KR); Yoon-sok Kang, Seongnam-si (KR); Myung-hoon Kim, Seoul (KR); Jun-ho Park, Gyeongsangnam-do (KR); Jin-hwan Park, Seoul (KR); Jae-gu Yoon, Suwon-si (KR); Byung-jin Choi, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 155 days.

(21) Appl. No.: 14/261,725

(22) Filed: Apr. 25, 2014

(65) Prior Publication Data
US 2014/0377655 A1    Dec. 25, 2014

(30) Foreign Application Priority Data

Jun. 24, 2013  (KR) .................. 10-2013-0072720

(51) Int. Cl.
*H01M 4/36*  (2006.01)
*H01M 4/485* (2010.01)
(Continued)

(52) U.S. Cl.
CPC .......... *H01M 4/366* (2013.01); *H01M 4/131* (2013.01); *H01M 4/485* (2013.01);
(Continued)

(58) Field of Classification Search
None
See application file for complete search history.

(56) References Cited

U.S. PATENT DOCUMENTS

| 2011/0042609 A1* | 2/2011 | Park ............... H01M 4/366 252/182.1 |
|---|---|---|
| 2011/0111298 A1 | 5/2011 | Lopez et al. |
| 2011/0244337 A1 | 10/2011 | Ohta et al. |

FOREIGN PATENT DOCUMENTS

| JP | 2011-113655 A | 6/2011 |
| JP | 2011-159528 A | 8/2011 |

(Continued)

OTHER PUBLICATIONS

English translation of Hiroshi et al (JP 2011-113655). Obtained from the JPO website Apr. 13, 2016.*

*Primary Examiner* — Sarah A Slifka
(74) *Attorney, Agent, or Firm* — Cantor Colburn LLP

(57) ABSTRACT

A composite cathode active material, a method of preparing the composite cathode active material, a cathode including the composite cathode active material, and a lithium battery including the cathode. The composite cathode active material includes a lithium intercalatable material; and a garnet oxide, wherein an amount of the garnet oxide is about 1.9 wt % or less, based on a total weight of the composite cathode active material.

15 Claims, 7 Drawing Sheets

(51) Int. Cl.
*H01M 4/131* (2010.01)
*H01M 4/1391* (2010.01)
*H01M 4/62* (2006.01)

(52) U.S. Cl.
CPC .......... *H01M 4/1391* (2013.01); *H01M 4/625* (2013.01); *Y02E 60/122* (2013.01)

(56) References Cited

FOREIGN PATENT DOCUMENTS

| | | |
|---|---|---|
| KR | 1020110019574 A | 2/2011 |
| KR | 1020120097513 A | 9/2012 |
| KR | 1020130008780 A | 1/2013 |

* cited by examiner

COMPOSITE CATHODE ACTIVE MATERIAL, METHOD OF PREPARING THE COMPOSITE CATHODE ACTIVE MATERIAL, AND CATHODE AND LITHIUM BATTERY EACH INCLUDING THE COMPOSITE CATHODE ACTIVE MATERIAL

CROSS-REFERENCE TO RELATED APPLICATIONS

This application claims priority to and the benefit of Korean Patent Application No. 10-2013-0072720, filed on Jun. 24, 2013, and all the benefits accruing therefrom under 35 U.S.C. §119, the content of which is incorporated herein in its entirety by reference.

BACKGROUND

1. Field

The present disclosure relates to a composite cathode active material, methods of preparing the composite cathode active material, and a cathode and a lithium battery, each including the composite cathode active material.

2. Description of the Related Art

For small and high-performance devices, high energy density is a desirable factor for lithium batteries, in addition to small-size and light-weight characteristics. High-voltage and high-capacity lithium batteries are increasingly desirable.

To provide an improved lithium battery, research into cathode active materials having a high voltage, excellent high-rate characteristics, and improved lifespan characteristics is being performed.

Available high-voltage cathode active materials cause side reactions with an electrolyte during charge and discharge, and lead to the production of by-products, such as free transition metal or a gas. Due to the side reaction of cathode active materials and the by-products generated from the cathode active materials, high-rate characteristics and lifespan characteristics of batteries may be degraded.

Accordingly, there is a need to develop a method of preventing the deterioration in performance of batteries including high-voltage cathode active materials.

SUMMARY

Provided is a composite cathode active material that has high voltage and prevents deterioration in the performance of a battery including the composite cathode active material.

Provided is a cathode including the composite cathode active material.

Provided is a lithium battery including the cathode.

Another aspect provides methods of preparing the composite cathode active material.

Additional aspects will be set forth in part in the description which follows and, in part, will be apparent from the description.

According to an aspect, a composite cathode active material includes: a lithium intercalatable material; and a garnet oxide, wherein an amount of the garnet oxide is about 1.9 weight percent (wt %) or less, based on a total weight of the composite cathode active material.

According to another aspect, a cathode includes the composite cathode active material.

According to another aspect, a lithium battery includes the cathode.

According to another aspect, disclosed is a method of preparing a composite cathode active material, the method including: forming a shell including contacting a lithium intercalatable material and a garnet oxide to form a shell including the garnet oxide on a core including the lithium intercalatable material to prepare the composite cathode active material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
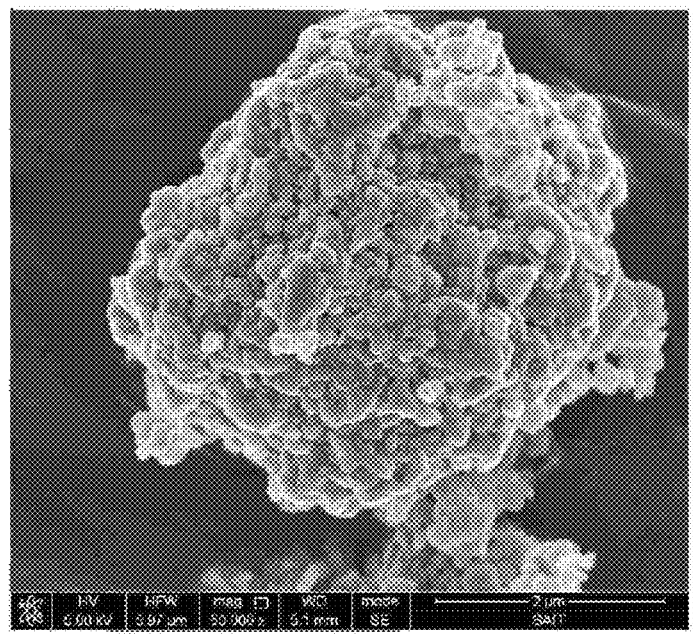
FIG. 1A is a scanning electron microscopic ("SEM") image of a composite cathode active material prepared according to Example 1.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Rare earth" means the fifteen lanthanide elements, i.e., atomic numbers 57 to 71, plus scandium and yttrium.

The term "intercalatable" means able to intercalate or deintercalate an ion.

Hereinafter, a composite cathode active material, methods of preparing the composite cathode active material, and a cathode and a lithium battery, each including the composite cathode active material, will be disclosed in further detail.

A composite cathode active material according to an embodiment includes a lithium intercalatable material, and a garnet-type oxide, wherein an amount of the garnet-type oxide is about 1.9 weight percent (wt %) or less, based on the total weight of the composite cathode active material.

Since the composite cathode active material includes the garnet-type oxide, the lithium ion transfer performance of the composite cathode active material may be improved and ultimately, performance of a lithium battery may be improved.

For example, since the composite cathode active material includes about 1.9 wt % or less of the garnet-type oxide, the composite cathode active material may have improved high-rate characteristics. When the amount of the garnet-type oxide is greater than about 1.9 wt %, the transfer of electrons may decrease due to the garnet-type oxide, and thus high-rate characteristics may decrease. When a garnet-type oxide is not included the composite cathode active material, the transfer of lithium ions also decreases, and thus high-rate characteristics may decrease.

For example, the amount of the garnet-type oxide in the composite cathode active material may be greater than 0 to about 1.9 wt %. For example, the amount of the garnet-type oxide in the composite cathode active material may be greater than 0 to about 1.8 wt %. For example, the amount of the garnet-type oxide in the composite cathode active material may be greater than 0 to about 1.7 wt %. For example, the amount of the garnet-type oxide in the composite cathode active material may be greater than 0 to about 1.6 wt %. For example, the amount of the garnet-type oxide in the composite cathode active material may be greater than 0 to about 1.5 wt %. For example, the amount of the garnet-type oxide in the composite cathode active material may be greater than about 0.01 wt % to about 1.9 wt %, or about 0.1 wt % to about 1.8 wt %, or about 0.2 wt % to about 1.7 wt %, or about 0.01 wt % to about 1.5 wt %. For example, the amount of the garnet-type oxide in the composite cathode active material may be greater than about 0.1 wt % to about 1.5 wt %. For example, the amount of the garnet-type oxide in the composite cathode active material may be greater than about 0.1 wt % to 1.0 about wt %. For example, the amount of the garnet-type oxide in the composite cathode active material may be greater than about 0.2 wt % to about 1.0 wt %. Within these amount ranges, improved battery characteristics may be obtained.

The composite cathode active material comprises a core and a shell disposed on at least a portion of the core, wherein the core comprises the lithium intercalatable material, which enables intercalation and deintercalation of lithium, and wherein the shell includes a garnet-type oxide. While not wanting to be bound by theory, it is understood that since the composite cathode active material has the core/shell structure, the core may not directly contact the electrolyte, or direct contact between the core and electrolyte may be reduced, and thus, a side reaction of the core with the electrolyte may be suppressed or effectively eliminated, the decomposition of the electrolyte at the surface of the core may be prevented, and elution and re-electrodeposition of metal ions included in the core may be prevented. Accordingly, lifespan characteristics of a lithium battery including the composite cathode active material may be improved.

For example, the shell may completely cover the core to completely block the core from an electrolyte. For example, although the shell may completely cover the core, due to the presence of pores in at least a portion of the shell, the core may contact an electrolyte through the pores. For example, the shell may incompletely cover the core. For example, the shell may be formed in a form of an island on the surface the core.

In the composite cathode active material, the shell and the core may form a mechanochemical bond. The shell may be formed on the core by using a dry coating method, for example, milling, thus, the core and the shell may form a mechanochemical bond. When the mechanochemical bond is formed, a binding force between the core and the shell may increase, and a denser shell may be obtained. For example, when a core particle and a particle for forming the shell are simply mixed, the core particle and the particle for forming the shell in the obtained mixture may have a simple physical bond, such as a Van der Waals bond therebetween. However, for forming the shell, when a particle of a material of the core and a particle of a material of the shell form a mechanochemical bond by, for example, a mechanofusion method, a Brunauer-Emmett-Teller ("BET") specific surface area of the obtained composite may be substantially reduced compared to a BET specific surface area of the simple mixture described above.

The garnet-type oxide included in the composite cathode active material may be represented by Formula 1:

$$L_{5+x}E_3(Me_zM_{2-z})O_d \quad \text{Formula 1}$$

wherein L is at least one of a monovalent cation and a bivalent cation, some or all of L is Li, E is a trivalent cation, Me and M are each independently a trivalent, a 4-valent, a 5-valent, or a 6-valent cation, $0<x\leq3$, $0\leq z\leq2$, and $0<d\leq12$, some or all of the O may be substituted with at least one of a 5-valent, a 6-valent, and a 7-valent anion, and some of the E may be substituted with a monovalent cation. For example, when $0<x\leq2.5$, E may be La and M may be Zr.

For example, the garnet-type oxide may be represented by Formula 2:

$$Li_{5+x}La_3(Zr_zA_{2-z})O_{12} \quad \text{Formula 2}$$

wherein A is at least one of Sc, Ti, V, Y, Nb, Hf, Ta, Al, Si, Ga, or Ge, $0<x\leq3$, and $0\leq z\leq2$.

For example, the garnet-type oxide may be at least one of $Li_7La_3Zr_2O_{12}$, $Li_{6.75}La_3(Zr_{1.75}Nb_{0.25})O_{12}$, $Li_{7.5}Rb_{0.25}La_{2.75}Zr_2O_{12}$, $Li_8Rb_{0.5}La_{2.5}Zr_2O_{12}$, $Li_9RbLa_2Zr_2O_{12}$, $Li_{7.125}Rb_{0.0625}La_{2.9375}Zr_2O_{12}$, $Li_6SrLa_2Ta_2O_{12}$, or $Li_{7.125}K_{0.0625}La_{2.9375}Zr_2O_{12}$.

The shell included in the composite cathode active material may additionally include a carbonaceous material. Since the shell additionally includes a carbonaceous material, which can have high electronic conductivity, electronic conductivity of the shell may be improved.

For example, the carbonaceous material may comprise at least one of a carbon nanotube, a carbon nanofiber, graphene, graphite, an expanded graphite, a carbon nanopowder, a hard carbon, or a soft carbon.

An amount of the carbonaceous material in the shell may be in a range of about 1 to about 80 wt %, or about 2 to about 70 wt %, or about 4 to about 60 wt %, based on the total weight of the shell, but is not limited thereto and may be selected to provide suitable battery characteristics. Alternatively, an amount of the carbonaceous material may be about 10 wt % or less, or about 1 to about 10 wt %, or about 2 to about 8 wt %, based on the total weight of the composite cathode active material.

An ion conductivity of the garnet-type oxide in the composite cathode active material may be $1.0\times10^{-6}$ Siemens per centimeter (S/cm) or more at a temperature of 25° C. An ion conductivity of the garnet-type oxide in the composite cathode active material may be $2.0\times10^{-6}$ S/cm or more at a temperature of 25° C. An ion conductivity of the garnet-type oxide in the composite cathode active material may be $5.0\times10^{-6}$ S/cm or more at a temperature of 25° C. An ion conductivity of the garnet-type oxide in the composite cathode active material may be $1.0\times10^{-5}$ S/cm or more at a temperature of 25° C. An ion conductivity of the garnet-type oxide in the composite cathode active material may be $2.0\times10^{-5}$ S/cm or more at a temperature of 25° C. An ion conductivity of the garnet-type oxide in the composite cathode active material may be $3.0\times10^{-5}$ S/cm or more at a temperature of 25° C. The ion conductivity of the garnet-type oxide may be an ion conductivity of lithium.

An activation energy of the garnet-type oxide of the composite cathode active material may be less than 0.45 electron volts (eV) at a temperature of −10° C. to 100° C. For example, an activation energy of the garnet-type oxide of the composite cathode active material may be 0.40 eV or less at a temperature of −10° C. to 100° C. An activation energy of the garnet-type oxide of the composite cathode active material may be 0.38 eV or lower at a temperature of −10° C. to 100° C. At a lower activation energy, ion conductivity of a solid ion conductor may be less sensitive to temperature and thus, within an operating temperature of a lithium battery, the garnet-type oxide may provide excellent ion conductivity.

The core of the composite cathode active material may comprise a lithium intercalatable lithium transition metal oxide, which enables intercalation and deintercalation of lithium. For example, the core may include an over-lithiated layered compound, a spinel compound, or an olivine compound.

For example, the core may comprise a compound represented by Formula 3:

$$Li_{2-x-y-z}Me_{x+y+z}O_{2+d} \quad \text{Formula 3}$$

wherein $x+y+z\leq1$, $0<x<1$, $0<y<1$, $0<z<1$, $0\leq d\leq0.1$, and Me is at least one of Mn, V, Cr, Fe, Co, Ni, Zr, Re, Al, B, Ge, Ru, Sn, Ti, Nb, Mo, or Pt.

For example, the core may comprise a compound represented by Formula 4:

$$Li_{2-x-y-z}Ma_xMb_yMc_zO_{2+d} \quad \text{Formula 4}$$

wherein x+y+z≤1, 0<x<1, 0<y<1, 0<z<1, 0≤d≤0.1, and Ma, Mb, and Mc are each independently at least one of Mn, Co, Ni, or Al.

For example, the core may comprise a compound represented by Formula 5:

$$Li_{2-x-y-z}Ni_xCo_yMn_zO_{2+d} \quad \text{Formula 5}$$

wherein x+y+z≤1; 0<x<1, 0<y<1, 0<z<1, and 0≤d≤0.1. For example, in Formula 5, 0<x<0.5, 0<y<0.2, 0.3<z<0.7. For example, in Formula 5, 0<x<0.3, 0<y<0.2, 0.4<z<0.6.

Also, in Formula 5, some or all of the Ni, Co, and/or Mn may be substituted with Al.

For example, the core may include a compound represented by Formula 6:

$$pLi_2MO_3\text{-}(1-p)LiMeO_2 \quad \text{Formula 6}$$

wherein 0<p<1, M is at least one of Ru, Rh, Pd, Os, Ir, Pt, Mg, Ca, Sr, Ba, Ti, Zr, Nb, Mo, W, Zn, Al, Si, Ni, Mn, Cr, Fe, Mg, Sr, V, or a rare earth element, and Me is at least one of Ti, V, Cr, Mn, Fe, Co, Ni, Cu, Al, Mg, Zr, or B.

For example, the core may include a compound represented by Formula 7:

$$xLi_2MO_3\text{-}yLiMeO_2\text{-}zLi_{1+d}M'_{2-d}O_4 \quad \text{Formula 7}$$

wherein x+y+z=1; 0<x<1, 0<y<1, 0<z<1; and 0≤d≤0.33, M is at least one of Ru, Rh, Pd, Os, Ir, Pt, Mg, Ca, Sr, Ba, Ti, Zr, Nb, Mo, W, Zn, Al, Si, Ni, Mn, Cr, Fe, Mg, Sr, V, or a rare earth element, Me is at least one of Ti, V, Cr, Mn, Fe, Co, Ni, Cu, Al, Mg, Zr, or B, and M' is at least one of Ti, V, Cr, Mn, Fe, Co, Ni, Cu, Al, Mg, Zr, or B.

For example, the core may include a compound represented by any one of Formulas 8 to 12:

$$Li_xCo_{1-y}M_yO_{2-a}X_a \quad \text{Formula 8}$$

$$Li_xCo_{1-y-z}Ni_yM_zO_{2-a}X_a \quad \text{Formula 9}$$

$$Li_xMn_{2-y}M_yO_{4-a}X_a \quad \text{Formula 10}$$

$$Li_xCo_{2-y}M_yO_{4-a}X_a \quad \text{Formula 11}$$

$$Li_xMe_yM_zPO_{4-a}X_a \quad \text{Formula 12}$$

In Formulas 8 to 12, 0.90≤x≤1.1, 0≤y≤0.9, 0≤z≤0.5, 1−y−z>0, 0≤a≤2, Me is at least one of Ti, V, Cr, Mn, Fe, Co, Ni, Cu, Al, Mg, Zr, or B, M is at least one of Mg, Ca, Sr, Ba, Ti, Zr, Nb, Mo, W, Zn, Al, Si, Ni, Mn, Cr, Fe, Mg, Sr, V, or a rare earth element, and X is at least one of O, F, S, or P.

For example, the core may include an olivine compound represented by Formula 13:

$$Li_xMe_yM'_zPO_{4-d}X_d \quad \text{Formula 13}$$

wherein 0.9≤x≤1.1, 0<y≤1, 0≤z≤1, 1.9≤x+y+z≤2.1, and 0≤d≤0.2; M is at least one of Fe, Mn, Ni, or Co; M' is at least one of Mg, Ca, Sr, Ba, Ti, Zr, Nb, Mo, W, Zn, Al, or Si; and X is at least one of S or F.

For example, the core may include at least one of $Li_{2-x-y-z}Ni_xCo_yMn_zO_2$ wherein 0<x<0.5, 0<y<0.5, and 0<z<0.9, $LiCoO_2$, $LiFePO_4$, $LiFe_{1-a}Mn_aPO_4$ wherein 0<a<1, $LiNi_{0.5}Mn_{1.5}O_4$, or $LiMnPO_4$.

A thickness of the shell of the composite cathode active material may be in a range of about 1 angstrom (Å) to about 1 micrometer (μm). For example, a thickness of the shell may be in a range of about 1 nanometer (nm) to about 1 μm. For example, a thickness of the shell may be in a range of about 10 nm to about 500 nm. For example, a thickness of the shell may be in a range of about 10 nm to about 100 nm. For example, a thickness of the shell may be in a range of about 10 nm to about 80 nm. Within such thickness ranges of the shell, lithium batteries with improved properties may be provided.

The core in the composite cathode active material may comprise particles having an average particle size of about 10 nm to about 500 μm, or 20 nm to 100 μm, or 40 nm to 10 μm. An average particle size of the core may be in a range of about 10 nm to about 100 μm. For example, an average particle size of the core may be in a range of about 10 nm to about 50 μm. For example, an average particle size of the core may be in a range of about 1 μm to about 30 μm. Within these core average particle size ranges, lithium batteries with improved properties may be provided.

A cathode according to an embodiment may include the composite cathode active material.

For example, to prepare the cathode, the composite cathode active material, a conducting agent, a binder, and a solvent may be combined to prepare a cathode active material composition. The cathode active material composition may be disposed, e.g., directly coated on, an aluminum current collector and dried to form a cathode plate including a cathode active material layer. According to another embodiment, the cathode active material composition may be cast on a separate support, and then a film, e.g., the cathode active material layer, exfoliated from the support and then laminated on the aluminum current collector to prepare a cathode plate including a cathode active material layer.

Examples of the conducting agent include at least one of a carbon, e.g., carbon black, graphite particulate, natural graphite, artificial graphite, acetylene black, KETJEN black, carbon fiber, and carbon nanotube; a metal, e.g., a metal powder, a metal fiber, or a metal tube, wherein the metal comprises copper, nickel, aluminum, or silver; or a conductive polymer, such as polyphenylene derivative. The conducting agent is not limited thereto, and may be any suitable conductive material.

The binder may comprise at least one of a vinylidene fluoride/hexafluoropropylene copolymer, polyvinylidene-fluoride, polyacrylonitrile, polymethylmethacrylate, polytetrafluoroethylene ("PTFE"), or a styrene butadiene rubber-based polymer may be used, and as a solvent, at least one of N-methylpyrrolidone ("NMP"), acetone, water, or the like may be used. The solvent is not limited thereto.

In an embodiment, a plasticizer may be further added to the cathode active material composition to form pores in an electrode plate.

Amounts of the composite cathode active material, the conductive material, the binder, and the solvent may be as those used in a current lithium battery, and can be determined by one of skill in the art without undue experimentation. According to the purpose and structure of a lithium battery, one or more of the conductive material, the binder, and the solvent may be omitted.

In addition, the cathode may further include, in addition to the composite cathode active material, and additional cathode active material.

The additional cathode active material may comprise any suitable lithium-containing metal oxide that is used in the art. For example, at least one composite oxide of lithium and at least one metal of cobalt, manganese, or nickel may be used. The composite oxide may be represented by one of $Li_aA_{1-b}Z_bD_2$ (wherein 0.90≤a≤1, and 0≤b≤0.5); $Li_aE_{1-b}Z_bO_{2-c}D_c$ (wherein 0.90≤a≤1, 0≤b≤0.5, and 0≤c≤0.05); $LiE_{2-b}Z_bO_{4-c}D_c$ (wherein 0≤b≤0.5, and 0≤c≤0.05); $Li_aNi_{1-b-c}Co_bZ_cD_a$ (wherein 0.90≤a≤1, 0≤b≤0.5, 0≤c≤0.05, and 0<a<2); $Li_aNi_{1-b-c}Co_bZ_cO_{2-a}X_a$ (wherein 0.90≤a≤1, $0 \leq b \leq 0.5$, $0 \leq c \leq 0.05$, and $0<a<2$); $Li_aNi_{1-b-c}Co_bZ_cO_{2-a}X_2$ (wherein $0.90 \leq a \leq 1$, $0 \leq b \leq 0.5$, $0 \leq c \leq 0.05$, and $0<a<2$); $Li_aNi_{1-b-c}Mn_bZ_cD_a$ (wherein $0.90 \leq a \leq 1$, $0 \leq b \leq 0.5$, $0 \leq c \leq 0.05$, and $0<a<2$); $Li_aNi_{1-b-c}Mn_bZ_cO_{2-a}X_a$ (wherein $0.90 \leq a \leq 1$, $0 \leq b \leq 0.5$, $0 \leq c \leq 0.05$, and $0<a<2$); $Li_aNi_{1-b-c}Mn_bZ_cO_{2-a}X_2$ (wherein $0.90 \leq a \leq 1$, $0 \leq b \leq 0.5$, $0 \leq c \leq 0.05$, and $0<a<2$); $Li_aNi_bE_cG_dO_2$ (wherein $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1$, and $0.001 \leq b \leq 0.1$); $Li_aCoG_bO_2$ (wherein $0.90 \leq a \leq 1$, and $0.001 \leq b \leq 0.1$); $Li_aMnG_bO_2$ (wherein $0.90 \leq a \leq 1$, and $0.001 \leq b \leq 0.1$); $Li_aMn_2G_bO_4$ (wherein $0.90 \leq a \leq 1$, and $0.001 \leq b \leq 0.1$); $QO_2$; $QS_2$; $LiQS_2$; $V_2O_5$; $LIV_2O_5$; $LiQ'O_2$; $LiNiVO_4$; $Li_{(3-f)}J_2(PO_4)_3(0 \leq f \leq 2)$; $Li_{(3-f)}Fe_2(PO_4)_3(0 \leq f \leq 2)$; and $LiFePO_4$:

wherein

A is at least one of Ni, Co, or Mn;

Z is at least one of Al, Ni, Co, Mn, Cr, Fe, Mg, Sr, V, or a rare-earth element;

D is at least one of O, F, S, or P;

E is at least one of Co, or Mn;

X is at least one of F, S, or P;

G is at least one of Al, Cr, Mn, Fe, Mg, La, Ce, Sr, or V;

Q is at least one of Ti, Mo, or Mn;

I is at least one of Cr, V, Fe, Sc, or Y; and

J is at least one of V, Cr, Mn, Co, Ni, or Cu.

For example, $LiCoO_2$, $LiMn_xO_{2x}$ (e.g., wherein x=1 or 2), $LiNi_{1-x}Mn_xO_{2x}$ ($0<x<1$), $LiNi_{1-x-y}Co_xMn_yO_2$ ($0 \leq x \leq 0.5$, $0 \leq y \leq 0.5$), $FePO_4$, or the like may be used.

These compounds may have a coating layer on their surfaces, or these compounds may be combined with a compound having a coating layer. The coating layer may include an oxide, a hydroxide, an oxyhydroxide, an oxycarbonate, or a hydroxycarbonate. The coating layer may comprise an amorphous or crystalline compound. The coating layer may comprise a compound comprising at least one of Mg, Al, Co, K, Na, Ca, Si, Ti, V, Sn, Ge, Ga, B, As, or Zr. The coating layer may be formed by using any suitable coating methods, wherein suitable coating methods are those which do not adversely affect desirable properties of the cathode active material. Suitable coating methods may include, for example, spray coating, immersion, or the like. Details of suitable coating methods may be determined by one of skill in the art without undue experimentation, and thus are not described in further detail herein.

A lithium battery according to an embodiment includes a cathode including the composite cathode active material. The lithium battery may be manufactured by the following method.

First, a cathode is manufactured by the cathode manufacturing method described above.

Then, an anode may be manufactured by the following manner. The anode may be manufactured in the same manner as used to manufacture the cathode, except that an anode active material is used instead of the composite cathode active material. In addition, a conductive material, a binder, and a solvent used in an anode active material composition may be the same as those used in the cathode.

For example, an anode active material, a conducting agent, a binder, and a solvent may be combined to prepare an anode active material composition, and the anode active material composition may be directly disposed on, e.g., coated on, a copper current collector to manufacture an anode plate. According to another embodiment, the anode active material composition is cast on a separate support, and an anode active material film exfoliated from the support and laminated on a copper current collector to manufacture an anode plate.

In addition, the anode active material may comprise any suitable material that is used as an anode active material for a lithium battery in the art. For example, the anode active material may include at least one of lithium metal, a lithium-alloyable metal, a transition metal oxide, a non-transition metal oxide, or a carbonaceous material.

For example, the lithium-alloyable metal may comprise Si, Sn, Al, Ge, Pb, Bi, Sb, a Si—Y alloy (wherein Y is at least one of an alkali metal, alkaline earth metal, a Group 13 element, a Group 14 element, a transition metal, or a rare-earth element, and Y is not Si), or a Sn—Y alloy (wherein Y is at least one of an alkali metal, an alkaline earth metal, a Group 13 element, a Group 14 element, a transition metal, or a rare-earth element, and Y is not Sn). The element Y may comprise at least one of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, or Po.

For example, the transition metal oxide may comprise at least one of lithium titanium oxide, vanadium oxide, or lithium vanadium oxide.

For example, the transition metal oxide may comprise at least one of $SnO_2$, $SiO_x$ (wherein $0<x<2$), or the like.

The carbonaceous material may comprise at least one of a crystalline carbon or an amorphous carbon. The crystalline carbon may comprise at least one of a natural or artificial graphite that is amorphous, tabular, flake, circular, or fibrous, and the amorphous carbon may be a soft carbon (e.g., cold calcined carbon) or a hard carbon, meso-phase pitch carbide, or a calcined cork.

Amounts of the anode active material, the conductive material, the binder, and the solvent may be those used in the art, and can be determined by one of skill in the art without undue experimentation.

Then, a separator which is to be disposed between the cathode and the anode is prepared. As a separator, any suitable material that is used in the art may be used. For example, the separator may have a low resistance to movement of electrolytic ions and excellent electrolyte-retaining capabilities. For example, at least one of glass fiber, polyester, Teflon, polyethylene, polypropylene, or polytetrafluoroethylene ("PTFE"), each of which may be in a woven- or non-woven form, may be used. In detail, a separator for a lithium ion battery may be a rollable separator formed of polyethylene or polypropylene, and a separator for a lithium ion polymer battery may be a separator having excellent organic electrolyte-retaining capabilities. For example, the separator may be prepared by using the following method.

A separator composition may be prepared by mixing a polymer resin, a filler, and a solvent. The separator composition may be directly coated or dried on an electrode to complete the formation of the separator. Alternatively, the separator composition may be cast on a separate support and then a film separated from the support is laminated on an electrode, thereby completing the formation of the separator.

A polymer resin used in preparing the separator may not be particularly limited, and any suitable material used for a binder of an electrode plate may be used. For example, at least one of a vinylidene fluoride/hexafluoropropylene copolymer, polyvinylidenefluoride ("PVDF"), polyacrylonitrile, or polymethylmethacrylate.

Then, an electrolyte is prepared.

For example, the electrolyte may be an organic electrolyte. According to another embodiment, the electrolyte may be a solid, e.g., an inorganic material. For example, boron oxide, lithium oxynitride, or the like may be used, but the electrolyte may not be limited thereto, and the electrolyte may be any suitable materials that is used as a solid electrolyte in the art. The solid electrolyte may be formed on an anode by, for example, sputtering.

For example, an organic electrolyte may be prepared. The organic electrolyte may be prepared by dissolving a lithium salt in an organic solvent.

The organic solvent may comprise any suitable material that is used as an organic solvent in the art. For example, the organic solvent may comprise at least one of propylene carbonate, ethylene carbonate, fluoro ethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofurane, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethyleneglycol, or dimethylether.

The lithium salt may comprise any suitable lithium salt used in the art. For example, the lithium salt may comprise at least one of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, or LiI.

Figure 5:
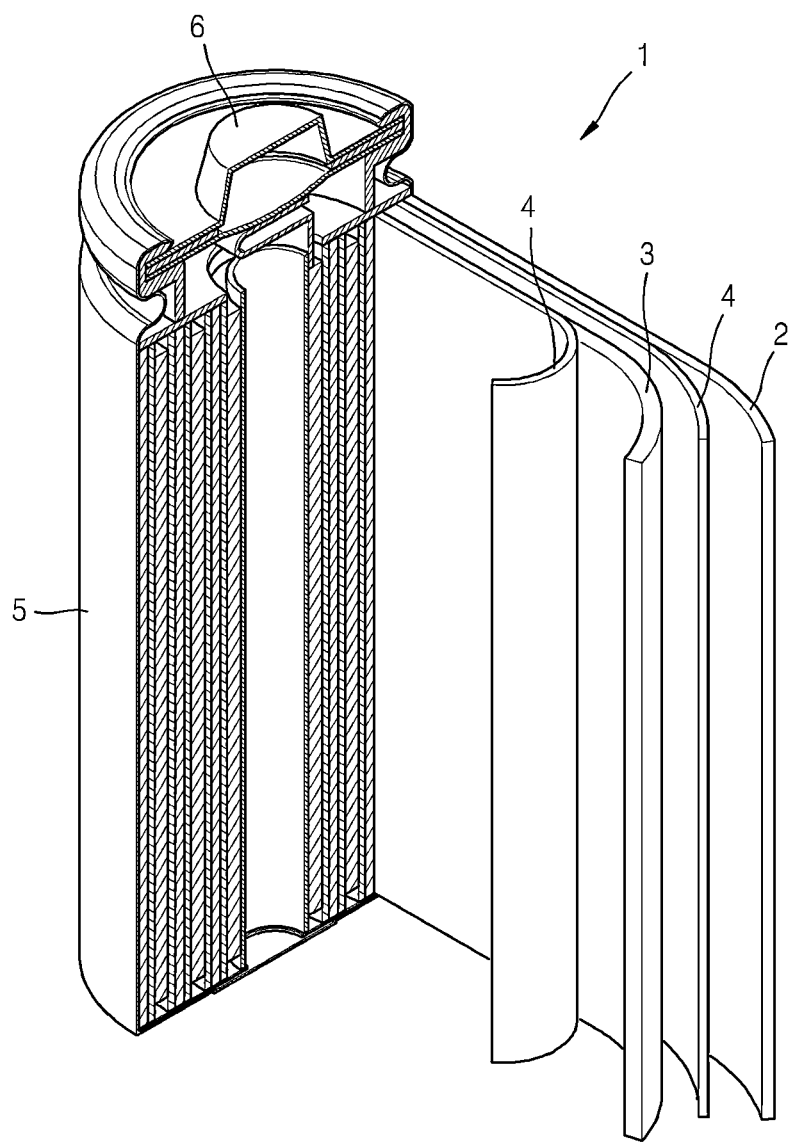
FIG. 5 is a schematic view of an embodiment of a lithium battery.

As shown in FIG. 5, a lithium battery 1 includes a cathode 3, an anode 2, and a separator 4. The cathode 3, the anode 2, and the separator 4 are wound or folded to be placed in a battery case 5. Then, an organic electrolyte is disposed in the batter case 5, and then sealed with a cap assembly 6 to complete the manufacturing of the lithium battery 1. The battery case 5 may be a circular case, a rectangular case, or a thin-film type case. For example, the lithium battery may be a large thin film-type battery. The lithium battery may be a lithium ion battery.

The separator 4 may be disposed between the cathode 3 and the anode 2 to complete the manufacturing of a battery assembly. When battery assemblies are stacked in a bi-cell structure, the resulting structure is immersed in an organic electrolyte, and the obtained assembly is housed in a pouch, followed by being sealed to complete the manufacturing of a lithium ion polymer battery.

In addition, battery assemblies may be stacked to form a battery pack, and the battery pack may be used in various applications to provide high capacity and high performance. For example, the battery pack may be used in a notebook, a smart phone, an electric vehicle, or the like.

In addition, the lithium battery may be used in an electric vehicle ("EV") due to its lifetime characteristics and high-rate characteristics. For example, the lithium battery may be used in a plug-in hybrid electric vehicle ("PHEV"). In addition, the lithium battery may be used in applications requiring a great amount of electric power. For example, the lithium battery may be used in an electric bicycle, an electric tool, or the like.

A method of preparing a composite cathode active material, according to an embodiment, includes forming a shell comprising the garnet-type oxide on a core particle comprising a lithium intercalatable material.

For example, the shell may be formed by a dry coating method.

When the shell is formed by a dry coating method, the method may comprise contacting a lithium intercalatable material for a core, which is an electrode active material enabling intercalation and deintercalation of lithium, and a garnet-type oxide; and forming a shell, e.g., a coating, comprising the garnet-type oxide on the core by the dry coating method.

The dry coating method may comprise a method of forming a shell (or a surface-treated layer) by applying mechanical energy to a mixture including a core particle including an electrode active material and a lithium metal oxide particle, without use of a solvent.

The dry coating method may comprise, for example, a) a method which comprises disposing, e.g., contacting and/or attaching, a powder of a covering material, for example a garnet-type oxide powder, and a surface of a particle of a lithium intercalatable material with a low speed ball mill, e.g., one operating at about 200 to about 2000 revolutions per minute ("RPM"), and simultaneously cohering the attached particles of the lithium intercalatable material and the garnet-type oxide to each other to form a shell of the garnet-type oxide on a core of the lithium intercalatable material, b) a method comprising confining and/or attaching covering material particles comprising the garnet-type oxide on a surface of particles of the lithium intercalatable material for the core by rotation of a grinding media and/or a rotator disposed in an apparatus, e.g., a KADY mill, and simultaneously mechanically binding the covering material particles on the core particle by stresses or binding the particles by softening or fusing a shell of the covering material particles, e.g. the garnet-type oxide, on the core particle by a heat produced by the stresses, or c) a method which comprises fusing a portion or the entire shell and the core by performing a heat treatment on the core covered with the shell, which may be formed according to the foregoing methods a) and/or b) and then cooling. The method is not limited thereto, and any suitable dry coating process used in the art may be used.

For example, the dry coating method may be any suitable method comprising a ball mill method, a low-speed ball mill method, a high-speed ball mill method, a hybridization method, or a mechanofusion method. In the low-speed ball mill method, a ball mill operating at about 200 to about 2000 RPM may be used. In the high-speed ball mill method, a ball mill operating at about 2000 to about 10,000 RPM may be used. For example, the dry coating method may be a mechanofusion method.

According to the mechanofusion method, a mixture is provided into a vessel that is rotating and then, due to a centrifugal force, the mixture is fixed on an inner wall of the vessel and then, the mixture is compressed in a gap between the inner wall of the vessel and an arm head near the inner wall of the vessel. The mechanofusion method corresponds to the method b).

The dry coating method may further include heat treating the resulting composition including the shell after the formation of the shell. Due to the heat treatment, the shell may be more firmly bonded and/or more stable than before the heat treatment. A heat treatment condition that may fuse a portion or the entire shell may be available.

In the method, an amount of the garnet-type oxide may be about 2 wt % or less, based on the total weight of the core and the garnet-type oxide. For example, an amount of the garnet-type oxide may be in a range of greater than 0 to about 2 wt %, based on the total weight of the core and the garnet-type oxide. For example, the amount of the garnet-type oxide may be greater than 0 to about 1.5 wt %, based on the total weight of the core and the garnet-type oxide. For example, the amount of the garnet-type oxide may be greater than 0 to about 1.0 wt %, based on the total weight of the core and the garnet-type oxide.

In the method, the shell may be formed by using, in addition to the garnet-type oxide, a carbonaceous material. For example, the carbonaceous material may comprise at least one of a carbon nanotube, a carbon nanofiber, graphene, an expanded graphite, a carbon nanopowder, a hard carbon, and a soft carbon. An amount of the carbonaceous material may be in a range of 1 to 300 parts by weight, based on 100 parts by weight of the garnet-type oxide.

Hereinafter, embodiments are described in further detail with reference to Examples and Comparative Examples. The Examples are presented herein for illustrative purpose only, and do not limit the scope of the present disclosure.

EXAMPLES

Preparation of Garnet-Type Oxide

Preparation Example 1

LiOH, which is a Li precursor, $La_2O_3$, which is a La precursor, and $ZrO_2$, which is a Zr precursor, were used as starting materials and combined in a stoichiometry to obtain $Li_7La_3Zr_2O_{12}$ to form a mixture.

The mixture was mixed and milled in isopropyl alcohol using a planetary ball mill (400 RPM, zirconia oxide ball) for 6 hours. The milled and mixed powder was placed in an alumina melting pot, and calcined in air at a temperature of 900° C. for 12 hours.

To compensate for loss of Li, excess LiOH was added, in an amount of 10 wt % with respect to an amount of Li contained in the final product composition, to the calcined powder.

The resulting mixture, including the lithium hydroxide, was mixed and milled for 6 hours in isopropyl alcohol using a planetary ball mill (500 RPM, zirconia oxide ball). The calcined powder was molded in the form of pellet or thin film or was not molded, and then calcined in air at a temperature of 1100° C. for 20 hours to complete the preparation of a solid ion conductor.

Subsequently, the $Li_7La_2Zr_3O_{12}$ was milled using a ball mill for 24 hours to prepare $Li_7La_2Zr_3O_{12}$ particles having an average particle size of about 100 nm.

Preparation Example 2

A solid ion conductor was prepared in the same manner as in Preparation Example 1, except that a stoichiometric ratio of the starting materials was changed to obtain $Li_{6.75}La_3(Zr_{1.75}Nb_{0.25})O_{12}$, and additionally, $NbO_2$ was used.

Preparation Example 3

A solid ion conductor was prepared in the same manner as in Preparation Example 1, except that a stoichiometric ratio of the starting materials was changed to obtain $Li_{7.5}Rb_{0.25}La_{2.75}Zr_2O_{12}$, and additionally, $Rb_2CO_3$ was used.

Preparation Example 4

A solid ion conductor was prepared in the same manner as in Preparation Example 1, except that a stoichiometric ratio of the starting materials was changed to obtain $Li_{7.5}Rb_{0.5}La_{2.75}Zr_2O_{12}$, and additionally, $Rb_2CO_3$ was used.

Preparation Example 5

A solid ion conductor was prepared in the same manner as in Preparation Example 4, except that a stoichiometric ratio of the starting materials was changed to obtain $Li_9RbLa_2Zr_2O_{12}$.

Preparation Example 6

A solid ion conductor was prepared in the same manner as in Preparation Example 4, except that a stoichiometric ratio of the starting materials was changed to obtain $Li_{7.125}Rb_{0.0625}La_{2.9375}Zr_2O_{12}$.

Preparation Example 7

A solid ion conductor was prepared in the same manner as in Preparation Example 1, except that a stoichiometric ratio of the starting materials was changed to obtain $Li_6SrLa_2Ta_2O_{12}$, and additionally, $SrCO_3$ was used.

Preparation Example 8

A solid ion conductor was prepared in the same manner as in Preparation Example 1, except that a stoichiometric ratio of the starting materials was changed to obtain $Li_{7.125}K_{0.0625}La_{2.9375}Zr_2O_{12}$, and additionally, KOH was used.

Preparation of Composite Cathode Active Material

Example 1

Figure 1B:
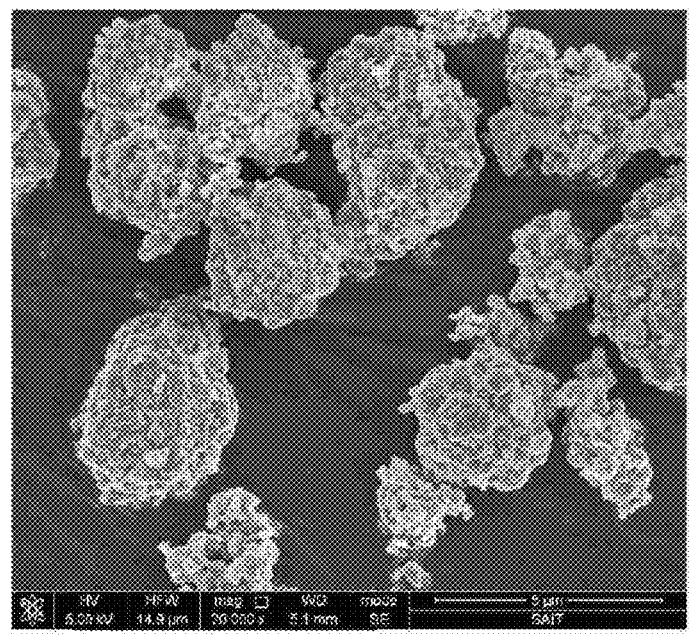
FIGS. 1B and 1C are each alternative views of the composite cathode active material prepared according to Example 1.
Figure 1C:
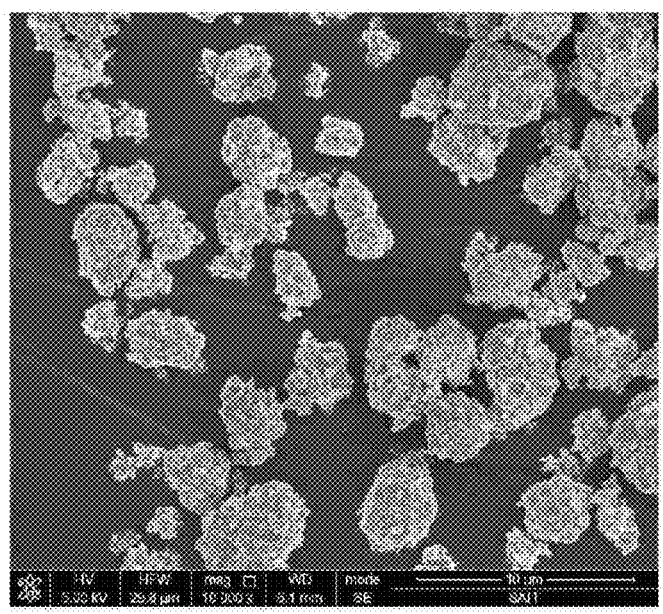

0.2 parts by weight of $Li_7La_2Zr_3O_{12}$ particles prepared according to Preparation Example 1 and 100 parts by weight of $Li_{1.18}Ni_{0.17}Co_{0.1}Mn_{0.56}O_2$ powder having an average particle size of 10 μm were combined to form a mixture. The mixture was placed in a dry surface treatment apparatus (Hosokawa Micron Corporation, Japan, Mechanofusion device, Nobilta-mini) and then, treated for 20 minutes at 3000 RPM to prepare a composite cathode active material in which a shell including $Li_7La_2Zr_3O_{12}$ was formed on a $Li_{1.18}Ni_{0.17}Co_{0.1}Mn_{0.56}O_2$ core. The prepared composite cathode active material is shown in FIGS. 1A to 1C.

Example 2

A composite cathode active material was prepared in the same manner as in Example 1, except that an amount of the $Li_7La_2Zr_3O_{12}$ was 0.5 parts by weight.

Example 3

A composite cathode active material was prepared in the same manner as in Example 1, except that an amount of the $Li_7La_2Zr_3O_{12}$ particles was 1.0 part by weight.

Example 4

A composite cathode active material was prepared in the same manner as in Example 3, except that 1.0 part by weight of multi-walled carbon nanotube (MWCNT, e-nanotech) was used instead of 1.0 part by weight of the $Li_7La_2Zr_3O_{12}$ particles.

Example 5

A composite cathode active material was prepared in the same manner as in Example 3, except that 1.0 part by weight of a multi-walled carbon nanotube (MWCNT, e-nanotech) and 0.5 parts by weight of $Li_7La_2Zr_3O_{12}$ particles were used instead of 1.0 part by weight of $Li_7La_2Zr_3O_{12}$ particles.

Examples 6 to 12

A composite cathode active material was prepared in the same manner as in Example 1, except that the garnet-type oxides (a solid ion conductor) prepared according to Preparation Examples 2 to 8 were used.

Comparative Example 1

$Li_{1.18}Ni_{0.17}Co_{0.1}Mn_{0.56}O_2$ powder having an average particle size of 10 μm was used as a cathode active material without the forming of a surface-treated layer.

Comparative Example 2

A composite cathode active material was prepared in the same manner as in Example 1, except that an amount of $Li_7La_2Zr_3O_{12}$ particle was 2.0 parts by weight.

Comparative Example 3

0.2 parts by weight of $Li_7La_2Zr_3O_{12}$ particles prepared according to Preparation Example 1 and 100 parts by weight of $Li_{1.18}Ni_{0.17}Co_{0.1}Mn_{0.56}O_2$ powder having an average particle size of 10 μm were simply mixed to prepare a composite cathode active material.

Preparation of Cathode

Example 13

The composite cathode active material prepared according to Example 1, a carbon conducting agent (Denka Black), and polyvinylidenefluoride ("PVdF") were combined at a weight ratio of 92:4:4 to form a mixture, and then, the mixture was mixed with N-methylpyrrolidone ("NMP") in an agate mortar to prepare slurry. The slurry was bar-coated on a 15 μm-thick aluminum current collector and then dried at room temperature, then dried in a vacuum at a temperature of 120° C., and then, pressed and punched to manufacture a 55 μm-thick cathode plate.

Examples 7 to 24

Cathode plates were prepared in the same manner as in Example 6, except that the composite cathode active materials of Examples 2 to 12 were prepared.

Comparative Examples 4 to 6

Cathode plates were prepared in the same manner as in Example 6, except that the cathode active materials of Comparative Examples 1 to 3 were prepared.

Comparative Example 7

A cathode plate was prepared in the same manner as in Example 6 except that the cathode active material of Comparative Example 1 was used, and then, a $Li_7La_2Zr_3O_{12}$ shell was formed on a cathode active material layer on the cathode plate. An amount of the garnet-type oxide layer was in a range of 1 part by weight, based on 100 parts by weight of the cathode active material.

In detail, an NMP solution containing 1 part by weight of $Li_7La_2Zr_3O_{12}$ was dropped onto a cathode active material layer of the cathode plate, and then, dried at a temperature of 120° C. in an oven to form a $Li_7La_2Zr_3O_{12}$ shell.

Manufacture of a Lithium Battery

Example 25

A coin cell was manufactured using the cathode plate prepared according to Example 13, a lithium metal a counter electrode, a PTFE separator, and as an electrolyte a solution in which 1.3 molar (M) $LiPF_6$ was dissolved in a solution of ethylene carbonate ("EC"), diethyl carbonate ("DEC"), and ethyl methyl carbonate ("EMC") at a volumetric ratio of 3:5:2.

Examples 26 to 36

Coin cells were manufactured in the same manner as in Example 25, except that the cathode plates prepared according to Examples 12 to 24 were used.

Comparative Examples 8 to 11

Coin cells were manufactured in the same manner as in Example 25, except that the cathode plates prepared according to Comparative Examples 4 to 7 were used.

Evaluation Example 1

XRD Analysis

Figure 2:
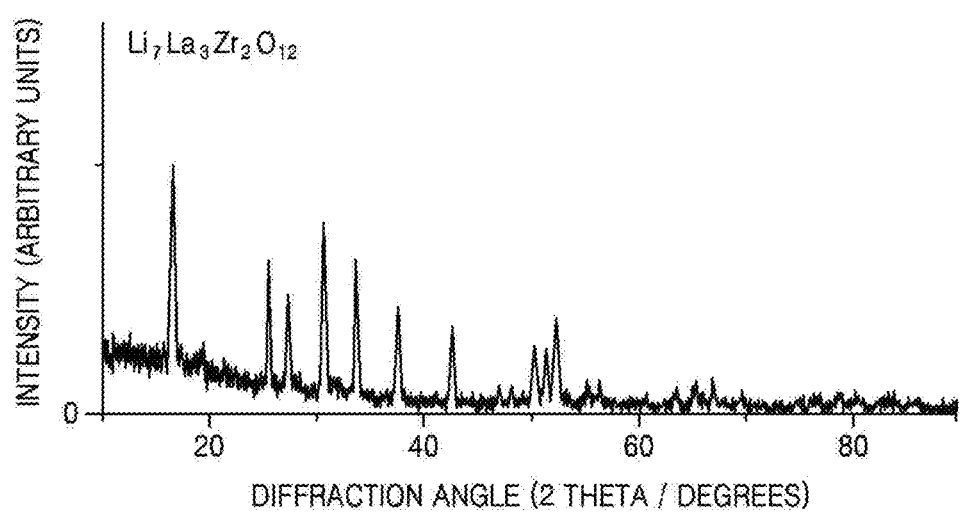
FIG. 2 is a graph of intensity (arbitrary units) versus diffraction angle (2 theta, degrees) and is an X-ray diffraction ("XRD") spectrum of a garnet-type oxide prepared according to Preparation Example 1.

X-ray diffraction ("XRD") analysis was performed on $Li_7La_2Zr_3O_{12}$ particles prepared according to Preparation Example 1, and results thereof are shown in FIG. 2. In the XRD Cu—Kα radiation was used.

As shown in FIG. 2, the peak of the garnet-type oxide was sharp, which means the garnet-type oxide has high crystallinity. The garnet-type oxide retained high crystallinity even after milling.

Evaluation Example 2

ICP-AES Analysis

Inductively coupled plasma-atomic emission spectrometry ("ICP-AES") analysis was performed on surfaces of the composite cathode active materials prepared according to Examples 1 to 3 and Comparative Example 1, and the obtained surface composite analysis results are shown in Table 1.

TABLE 1

|  | Li [% wt/wt] | Mn [% wt/wt] | Co [% wt/wt] | Ni [% wt/wt] | Zr [% wt/wt] | La [% wt/wt] |
|---|---|---|---|---|---|---|
| Example 1 | 1.403 | 0.603 | 0.198 | 0.199 | 0.00059 | 0.00062 |
| Example 2 | 1.403 | 0.604 | 0.200 | 0.202 | 0.00129 | 0.00139 |
| Example 3 | 1.403 | 0.600 | 0.200 | 0.201 | 0.00199 | 0.00262 |
| Comparative Example 1 | 1.437 | 0.603 | 0.198 | 0.199 | — | — |

As shown in Table 1, in the surfaces of the composite cathode active materials of Examples 1 to 3, La content and Zr content are increased, and in the case of Comparative Example 1, La and Zr were not detected.

Evaluation Example 2

TOF-SIMS Analysis

Time-of-flight secondary ion mass spectrometry ("TOF-SIMS") was performed on surfaces of the composite cathode active materials prepared according to Examples 1 to 3 and Comparative Examples 1 and 3, and the concentration depth profiles of the respective components from the surface to the inside are shown in FIGS. 3A to 3F.

Figure 3A:
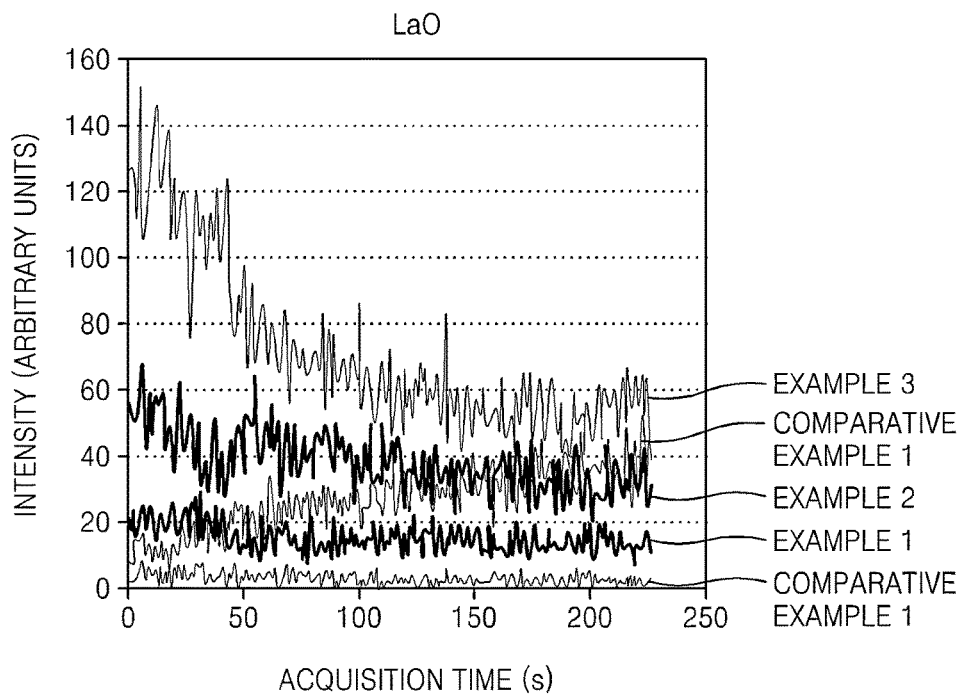
FIG. 3A is a graph of intensity (arbitrary units) versus acquisition time (seconds, s) which shows a time-of-flight secondary ion mass spectrometry ("ToF-SIMS") spectrum of LaO included in the composite cathode active materials prepared according to Examples 1 to 3 and Comparative Examples 1 and 3.
Figure 3B:
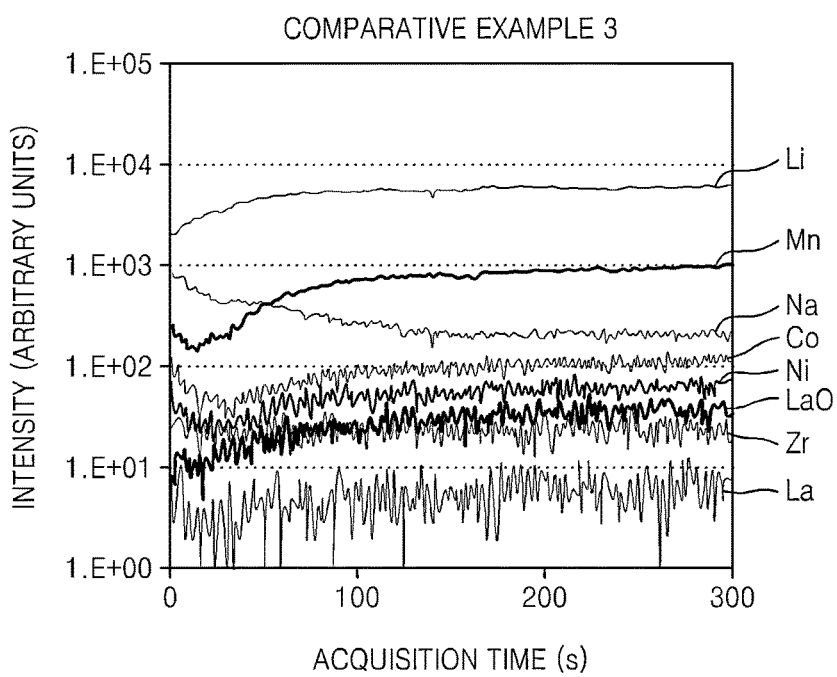
FIG. 3B is a graph of intensity (arbitrary units) versus acquisition time (seconds, s) which shows a ToF-SIMS spectrum of a composite cathode active material prepared according to Comparative Example 3.
Figure 3C:
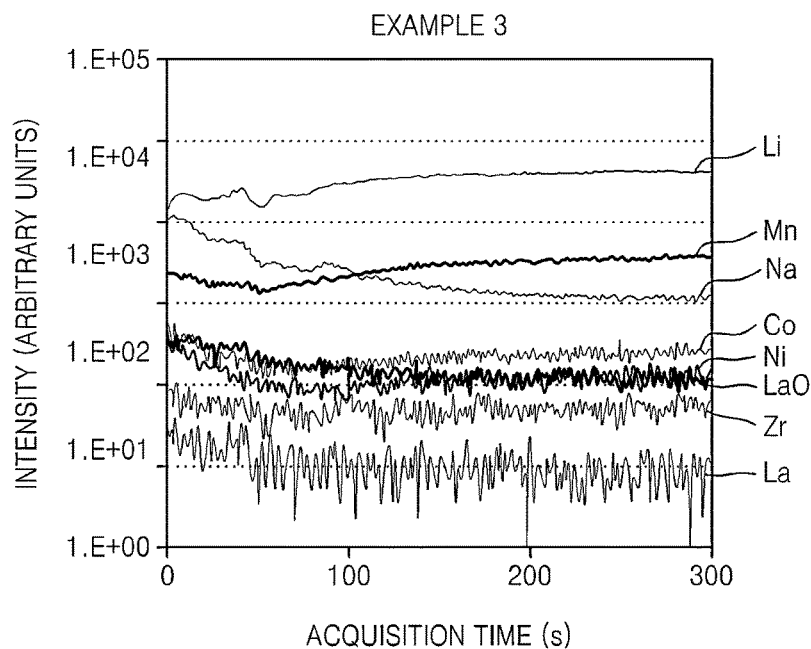
FIG. 3C is a graph of intensity (arbitrary units) versus acquisition time (seconds, s) which shows a ToF-SIMS spectrum of a composite cathode active material prepared according to Example 3.
Figure 3D:
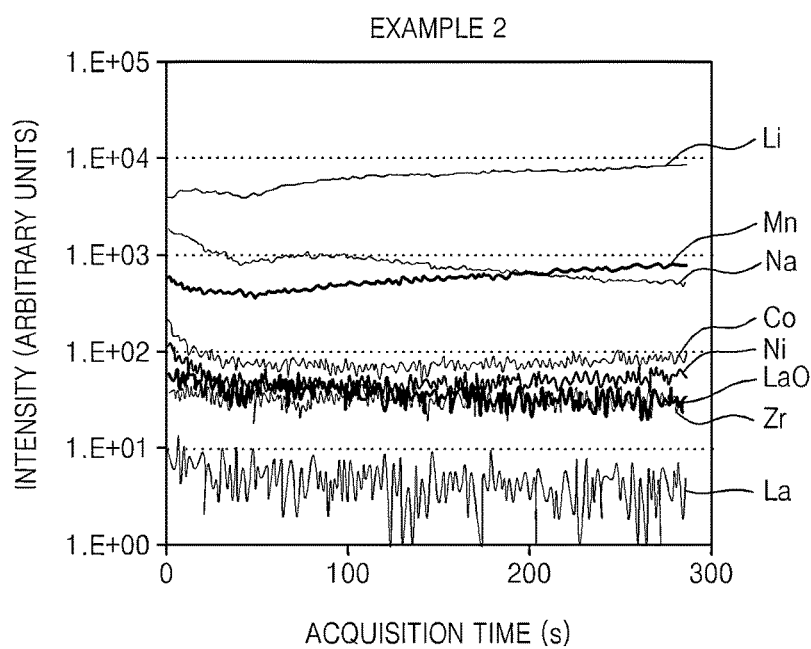
FIG. 3D is a graph of intensity (arbitrary units) versus acquisition time (seconds, s) showing which shows a ToF-SIMS spectrum of a composite cathode active material prepared according to Example 2.
Figure 3E:
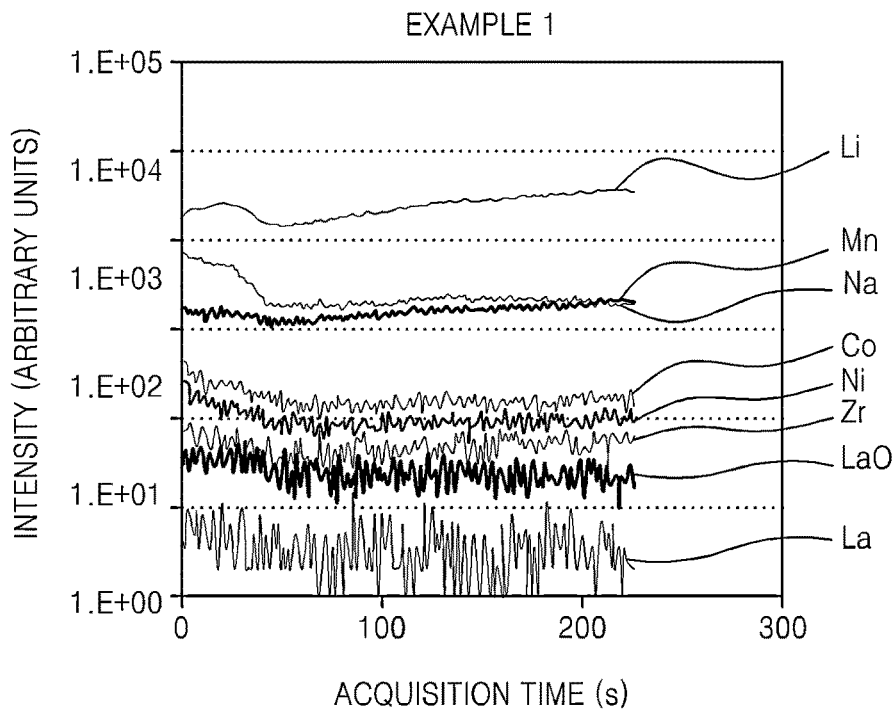
FIG. 3E is a graph of intensity (arbitrary units) versus acquisition time (seconds, s) which shows a ToF-SIMS spectrum of a composite cathode active material prepared according to Example 1.
Figure 3F:
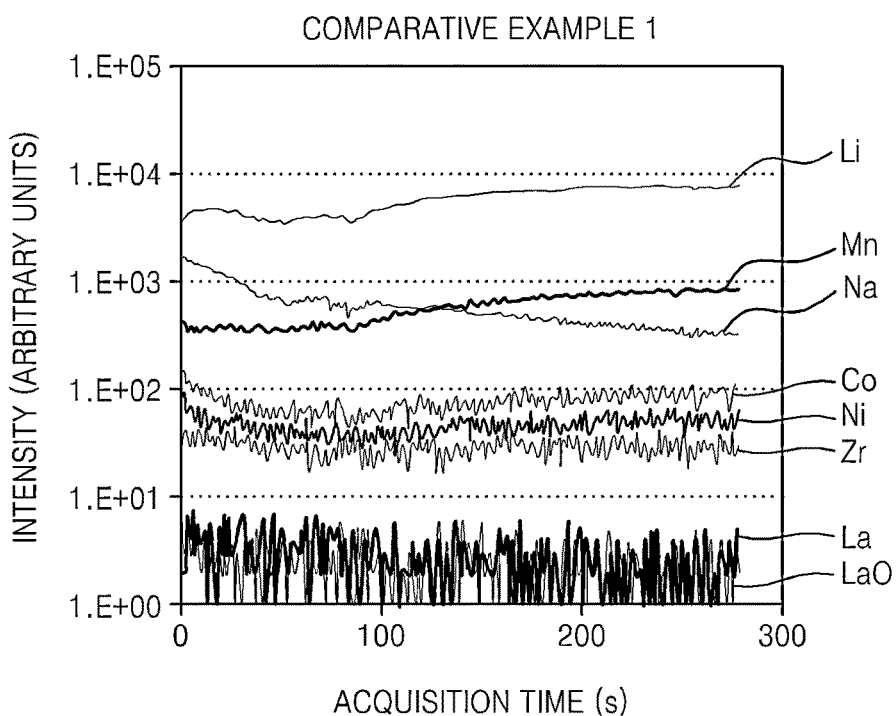
FIG. 3F is a graph of intensity (arbitrary units) versus acquisition time (seconds, s) which shows a ToF-SIMS spectrum of a composite cathode active material prepared according to Comparative Example 1.

As shown in FIG. 3A, a concentration of LaO on surfaces of the composite cathode active materials of Examples 1 to 3 was higher than that of Comparative Example 3 in which 1 wt % of garnet-type oxide was simply mixed. Accordingly, it was confirmed that a shell was formed on surfaces of the composite cathode active materials of Examples 1 to 3.

Evaluation Example 3

High-Rate Characteristics Evaluation

During a $1^{st}$ cycle, the coin cells manufactured according to Examples 25 to 36 and Comparative Examples 8 to 11 were constant-current charged at a rate of 0.1 C until the voltage reached 4.6 V and then, the coin cells were constant-current discharged at a rate of 0.1 C until the voltage reached 2.5 V.

During a $2^{nd}$ cycle, the coin cells were constant-current charged at a rate of 0.5 C until the voltage reached 4.6 V, and then, while the voltage maintained at 4.6 V, the coin cells were constant-voltage charged until the current reached 0.05 C and then, at a rate of 0.2 C, the coin cells were constant-current discharged until the voltage reached 2.5 V.

During a $3^{rd}$ cycle, the coin cells were constant-current charged at a rate of 0.5 C until the voltage reached 4.6 V, and then, while the voltage maintained at 4.6 V, the coin cells were constant-voltage charged until the current reached 0.05 C and then, at a rate of 1.0 C, the coin cells were constant-current discharged until the voltage reached 2.5 V.

During a $4^{th}$ cycle, the coin cells were constant-current charged at a rate of 0.5 C until the voltage reached 4.6 V, and then, while the voltage maintained at 4.6 V, the coin cells were constant-voltage charged until the current reached 0.05 C and then, at a rate of 2.0 C, the coin cells were constant-current discharged until the voltage reached 2.5 V.

Some of charging and discharging results are shown in Table 2 below. Initial coulombic efficiency and high-rate characteristics are respectively defined as shown Equations 1 and 2 below.

Initial coulombic efficiency [%]=[discharging capacity in $1^{st}$ cycle/charging capacity in $1^{th}$ cycle]×100    Equation 1

2C capacity retention ratio [%]=[discharging capacity in $4^{th}$ cycle/discharging capacity in $2^{nd}$ cycle]×100    Equation 2

TABLE 2

| | Initial charging and discharging efficiency [%] | 2 C capacity retention ratio [%] |
|---|---|---|
| Example 25 | 90.6 | 81.9 |
| Example 26 | 90.7 | 82.1 |

TABLE 2-continued

| | Initial charging and discharging efficiency [%] | 2 C capacity retention ratio [%] |
|---|---|---|
| Example 27 | 90.4 | 80.8 |
| Example 28 | 90.9 | 83.3 |
| Example 29 | 91.3 | 83.7 |
| Comparative Example 8 | 89.8 | 74.2 |
| Comparative Example 9 | 86.7 | 65.9 |
| Comparative Example 10 | 88.0 | 77.2 |
| Comparative Example 11 | 89.7 | 77.9 |

As shown in Table 2, the coin cells of Examples 25 to 29 had higher initial charging and discharging efficiency and better high-rate characteristics than the coin cells of Comparative Example 8 to 11.

Evaluation Example 7

Lifespan Characteristics Evaluation

The coin cells manufactured according to Examples 25 to 36 and Comparative Examples 8 and 11 were constant-current charged and discharged at a temperature of 45° C. in a voltage range of 2.5 to 4.6 V with respect to lithium metal at a rate of 1 C rate for 50 times. A capacity retention ratio in the $50^{th}$ cycle is indicated as Equation 3 below. The capacity retention ratio in the $50^{th}$ cycle is shown in Table 3 and FIG. 3.

Capacity retention ratio in $50^{th}$ cycle [%]=[discharging capacity in $50^{th}$ cycle/discharging capacity in $1^{st}$ cycle]×100    Equation 3

TABLE 3

| | Capacity retention rate in 50th cycle [%] |
|---|---|
| Example 25 | 88.75 |
| Example 26 | 89.37 |
| Example 27 | 88.51 |
| Comparative Example 8 | 85.7 |
| Comparative Example 11 | 84.09 |

Figure 4:
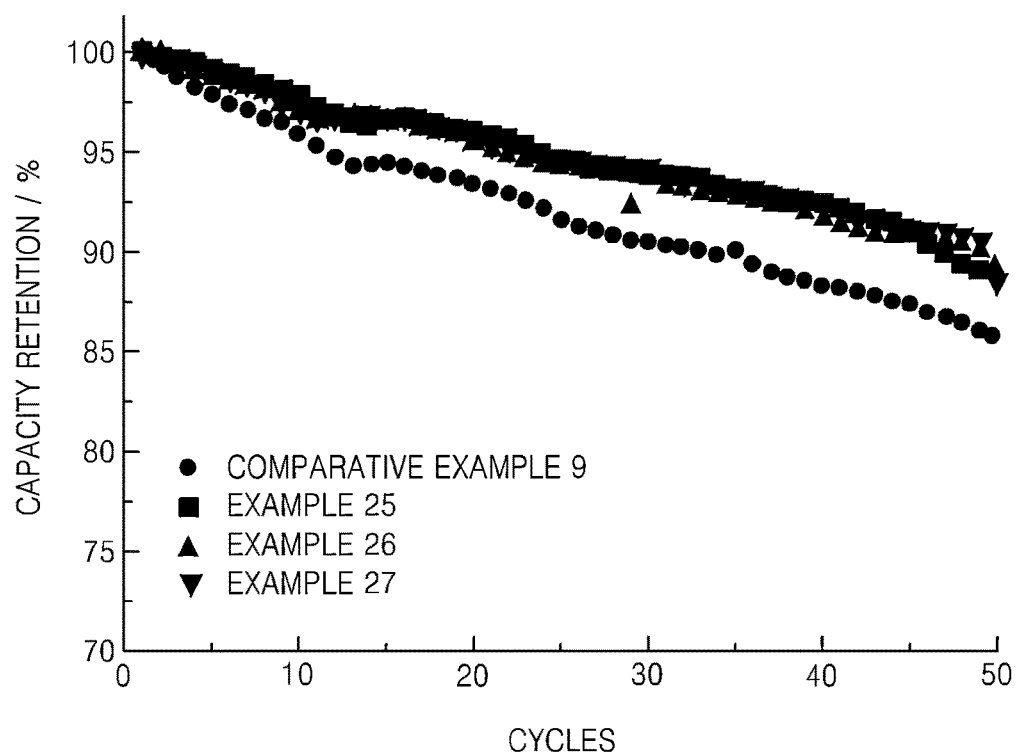
FIG. 4 is a graph of capacity retention (percent) versus number of cycles (cycle number) which shows lifespan characteristics of lithium batteries manufactured according to Examples 25 to 27 and Comparative Example 9.

As shown in Table 3 and FIG. 4, the coin cells manufactured according to Examples 25 to 27 showed substantially improved lifespan characteristics compared to the coin cells manufactured according to Comparative Examples 8 and 11.

According to an embodiment, due to the inclusion of a material that enables intercalation and deintercalation of lithium and a garnet-type oxide in a composite cathode active material, high-rate characteristics and lifespan characteristics of a lithium battery including the composite cathode active material may improve.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A composite cathode active material comprising:
a core and a shell disposed on at least a portion of the core,
wherein the core comprises a lithium intercalatable material and
the shell comprises a garnet oxide,
wherein an amount of the garnet oxide is less than 1.9 weight percent, based on a total weight of the composite cathode active material,
wherein the core comprises a compound represented by Formula 4:

$$Li_{2-x-y-z}Ma_xMb_yMc_zO_{2+d} \quad \text{Formula 4}$$

wherein $x+y+z \leq 1$; $0<x<1$, $0<y<1$, $0<z<1$, and $0 \leq d \leq 0.1$, and
Ma, Mb, and Mc are each independently at least one metal of Mn, Co, Ni, or Al.

2. The composite cathode active material of claim 1, wherein the shell and the core form a mechanochemical bond.

3. The composite cathode active material of claim 1, wherein the garnet oxide is represented by Formula 1 below:

$$L_{5+x}E_3(Me_zM_{2-z})O_d \quad \text{Formula 1}$$

wherein
L comprises at least one of a monovalent cation and a bivalent cation, wherein L comprises Li,
E comprises a monovalent cation and a trivalent cation,
Me and M each independently comprise a trivalent, a 4-valent, a 5-valent, or a 6-valent cation,
$0<x\leq 3$, $0\leq z\leq 2$, and $0<d\leq 12$,
O is optionally substituted with at least one of a 5-valent, a 6-valent, or a 7-valent anion.

4. The composite cathode active material of claim 1, wherein the garnet oxide is represented by Formula 2:

$$Li_{5+x}La_3(Zr_zA_{2-z})O_{12} \quad \text{Formula 2}$$

wherein
A comprises at least one of Sc, Ti, V, Y, Nb, Hf, Ta, Al, Si, Ga, or Ge,
$0<x\leq 3$, and $0\leq z\leq 2$.

5. The composite cathode active material of claim 1, wherein the garnet oxide comprises at least one of $Li_7La_3Zr_2O_{12}$, $Li_{6.75}La_3(Zr_{1.75}, Nb_{0.25})O_{12}$, $Li_{7.5}Rb_{0.25}La_{2.75}Zr_2O_{12}$, $Li_8Rb_{0.5}La_{2.5}Zr_2O_{12}$, $Li_9RbLa_2Zr_2O_{12}$, $Li_{7.125}Rb_{0.0625}La_{2.9375}Zr_2O_{12}$, $Li_6SrLa_2Ta_2O_{12}$, or $Li_{7.125}K_{0.0625}La_{2.9375}Zr_2O_{12}$.

6. The composite cathode active material of claim 1, wherein the shell further comprises a carbonaceous material.

7. The composite cathode active material of claim 6, wherein the carbonaceous material comprises at least one of a carbon nanotube, a carbon nanofiber, graphene, graphite, an expanded graphite, a carbon nanopowder, a hard carbon, or a soft carbon.

8. The composite cathode active material of claim 1, wherein the core comprises a compound represented by Formula 5:

$$Li_{2-x-y-z}Ni_xCo_yMn_zO_{2+d} \quad \text{Formula 5}$$

wherein $x+y+z\leq 1$; $0<x<1$, $0<y<1$, $0<z<1$, and $0\leq d\leq 0.1$.

9. A cathode comprising the composite cathode active material of claim 1.

10. A lithium battery comprising the cathode of claim 9.

11. A method of preparing a composite cathode active material, the method comprising:
contacting a lithium intercalatable material and a garnet oxide to form a shell comprising the garnet oxide disposed on a core comprising the lithium intercalatable material to prepare the composite cathode active material,
wherein an amount of the garnet oxide is less than 1.9 weight percent, based on a total weight of the composite cathode active material,
wherein the core comprises a compound represented by Formula 4:

$$Li_{2-x-y-z}Ma_xMb_yMc_zO_{2+d} \quad \text{Formula 4}$$

wherein $x+y+z\leq 1$, $0<x<1$, $0<y<1$, $0<z<1$, and $0\leq d\leq 0.1$, and
Ma, Mb, and Mc are each independently at least one metal of Mn, Co, Ni, or Al.

12. The method of claim 11, wherein the contacting comprises a dry coating method.

13. The method of claim 12, wherein the dry coating method comprises at least one of ball milling, a hybridization method, or a mechanofusion method.

14. The composite cathode active material of claim 1, wherein the amount of the garnet oxide is greater than 0 to about 1.5 wt %.

15. The composite cathode active material of claim 1, wherein the amount of the garnet oxide is greater than 0 to about 1.0 wt %.

* * * * *